(No Model.)
S. D. FIELD.
DUPLEX TELEGRAPH.
No. 244,218. Patented July 12, 1881.
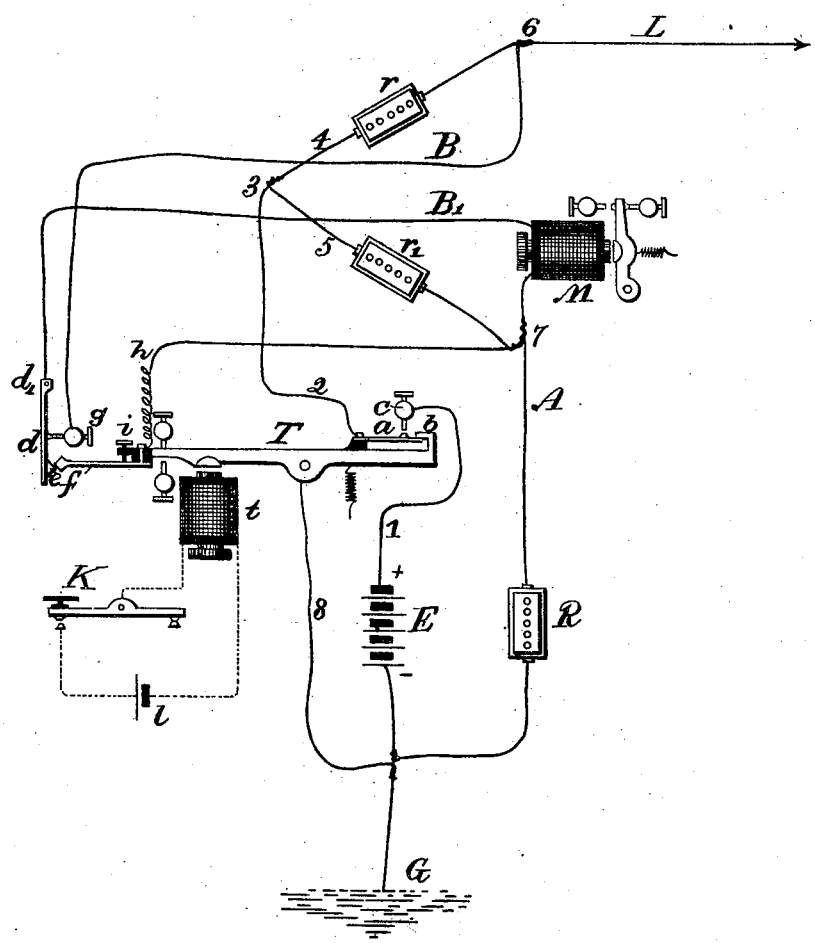
Witnesses:
Mrs. K. Lockwood French
Miller O'Earl
Inventor:
Stephen D. Field,
by his Attorney,
Frank L. Pope

UNITED STATES PATENT OFFICE.

STEPHEN D. FIELD, OF NEW YORK, N. Y.

DUPLEX TELEGRAPH.

SPECIFICATION forming part of Letters Patent No. 244,218, dated July 12, 1881.

Application filed June 8, 1881. (No model.)

*To all whom it may concern:*

Be it known that I, STEPHEN D. FIELD, a citizen of the United States, and a resident of the city, county, and State of New York, have invented certain new and useful Improvements in Duplex Telegraphs, of which the following is a specification.

In transmitting two sets of signals simultaneously in opposite directions over one and the same telegraph-line much interference and confusion arise from the false signals which are produced upon the receiving-instruments by currents of charge and discharge, which are due to the electrostatic or inductive capacity of the line. The phenomenon manifests itself more especially when the line is of considerable length and well insulated. The conditions under which this effect occurs are as follows: If an insulated telegraph-line of considerable length, having its remote end connected with the earth, is suddenly placed in connection with one pole of a battery whose opposite pole is likewise connected with the earth, a powerful current of electricity of momentary duration flows into the conductor, which is termed the "current of charge." As soon as the conductor has received its maximum charge a continuous and uniform current is established, which flows from the battery through the whole length of the conductor and returns through the earth from the distant station. The longer the line and the greater its resistance the greater is the strength of the current of charge in proportion to that of the permanent current which traverses the line after it has received its charge. If after the current has thus been established the line is disconnected from the battery at the home station and instantly connected with the earth, another powerful momentary current flows from the conductor back to the earth at the home station, which is termed the "current of discharge."

The essential condition required for the simultaneous transmission of telegraphic signals in opposite directions is that the signals transmitted by the key at either terminal station shall not produce any effect whatever upon the associate receiving-instrument at the same station.

In order to prevent the receiving-instrument at the home station from being actuated by the outgoing currents transmitted from the home battery, and which are designed to produce signals at the distant station, it is usual to employ a device termed an "artificial line," which consists of a branch or derived circuit, diverging from the main line at a point near its junction with the transmitting-key and proceeding directly to the earth, or, what is in effect the same thing, returning to the other pole of the battery. This derived circuit is provided with one or more adjustable artificial resistances, collectively termed a "rheostat," by means of which its total resistance may be so regulated as to bear a definite proportion to that of the main line. The home receiving-instrument may be rendered neutral to outgoing currents by well-known methods, one of which consists in placing it in the circuit of a bridge-wire, which is a branch or cross circuit, connecting the main and artificial lines at points of equal potential with reference to such currents. It has, however, been found by experience that while the resistance of the main and artificial lines may be the same, or may be in proper proportion to each other, their inductive or electrostatic capacity may be very different, the main line having great inductive capacity, while the artificial line has little or none. Hence, when a signal is transmitted by connecting the battery to the line, a current of charge will flow into the latter, and as this is not compensated by a similar current of charge flowing into the artificial line, a false signal is produced upon the receiving-instrument. So, also, when the battery is disconnected and the line put to earth at the home station, the discharge which takes place in part traverses the bridge-wire and receiving-instrument, and another false signal is produced.

The object of my invention is to prevent this action of the charge and discharge currents upon the receiving-instrument.

To this end my invention consists in a method of preventing the effects of the static charge and discharge of the line upon the receiving-instrument of a duplex telegraph, which consists in temporarily disconnecting the branch of the circuit containing the receiving-instrument, or in establishing a temporary connection between the terminals of the electro-magnet of the receiving-instrument, or preferably in performing both these operations simultaneously at the instant a connection is formed between the line and the battery or the earth at the home station.

The invention also consists in certain combinations of electric circuits and of mechanism whereby the hereinbefore-mentioned results are effected.

The accompanying drawing is a diagram representing the apparatus and electrical connections at one terminal station of a duplex telegraph to which my invention has been applied.

Referring to the diagram, E represents the main battery, the negative pole of which is connected directly to the earth at G in the usual manner.

T represents the lever of the transmitter, which is preferably actuated by an electro-magnet, $t$, placed in the circuit of the local battery $l$, (represented by a dotted line,) which is opened and closed by the manipulation of the key K. Upon the transmitter-lever T is mounted an insulated contact-spring, $a$. This normally rests against a contact-stop, $b$, formed upon the end of the lever T, which is therefore termed the "resting-stop." Just above the contact-spring $a$ is placed a fixed stop, $c$, in such a relative position thereto that when the transmitter-lever T is actuated by depressing the key K the contact-spring $a$ is brought against the stop $c$, which is termed the "working contact," and at the same instant the contact between the said spring and the stop $b$ is interrupted. The positive pole of the main battery E is connected by a conductor, 1, to the stop $c$. The lever T of the transmitter is connected directly with the earth by a conductor, 8. A conductor, 2, is attached to the insulated contact-spring $a$, and divides at the point 3 into two branches, 4 and 5. The branch 4 extends to the point 6, where it joins the main line L extending to the distant station. The other branch, 5, extends to the point 7, where it joins the artificial line A, which returns directly to the earth at G. Between the point 6 on the main line and the point 7 on the artificial line, a bridge-wire, B B', extends, (which, for the present, may be regarded as a normally-closed or continuous circuit,) in which is included the electro-magnet M of the home receiving-instrument. Rheostats or adjustable resistances $r\ r'$ are inserted in the wires 4 and 5, respectively, and another rheostat, R, is placed in the circuit of the artificial line A. In accordance with the well-known laws of electrical conduction, it will be evident that, if the amount of resistance in the rheostat R is made exactly equal to that of the line-wire L leading to the distant station and the resistances $r$ and $r'$ are made equal to each other, no current will pass through the bridge-wire B B' between the points 6 and 7. Moreover, the result will be the same in any case in which the proportion of the rheostat $r$ to the line L is the same as that of the rheostat $r'$ to the artificial line A, inclusive of the rheostat R. The rheostat R is preferably made adjustable, in order to compensate for the varying resistance of the main line under different conditions of insulation.

The organization which I have thus far described is well known and in common use, and in itself forms no part of my invention. Its practical operation is as follows: In transmitting a signal from the home station the key K is depressed by the operator, which causes the electro-magnet $t$ to attract its armature, and thereby raise the opposite extremity of the transmitter T. This brings the insulated spring $a$ into contact with the stop $c$, and thereby forms a connection between the battery E and both the main and artificial lines, L and A. In consequence of the inductive capacity of the line L, a current of charge traverses the wire 4 at the instant the battery is connected therewith, which current is not compensated by any corresponding current of charge in the wire 5, and consequently a difference of potential is caused between the points 6 and 7 and a false signal is produced upon the receiving-instrument. So, also, when the key K is released and the contact-spring $a$ is detached from the battery-contact $c$ and connected with the earth-contact $b$, a current of discharge takes place through the wire 4, which, in like manner, is not compensated by any corresponding current in the wire 5, and thus another false signal is produced.

I will now describe the improved apparatus which I have invented, by means of which this difficulty is obviated.

Upon the lever of the transmitter T is mounted a rigid insulated arm, $f$, which is capable of adjustment with reference to the position of the lever upon which it is mounted by means of a screw, $i$, or any equivalent device serving the same purpose. The arm $f$ is V-shaped at its extremity, and this portion of it, when actuated by the movement of the transmitter-lever T, is brought into contact with a wedge-shaped projection or tooth, $e$, mounted upon a flexible spring, $d$, which is attached to a suitable fixed support, $d'$. The spring $d$ is also provided with a contact-point, which normally rests upon the adjustable contact-screw $g$. The two parts of the bridge-wire, B and B', are respectively connected with the spring $d$ and the contact-screw $g$. The insulated arm $f$ is also connected, by means of the wire $h$, with the point 7 at the junction of the bridge-wire B' and the artificial line A. By an inspection of the diagram it will be understood that when a connection is formed between the wires B' and $h$ they act to shunt or short-circuit the coils of the electro-magnet M of the receiving-instrument.

The practical operation of the hereinbefore-described organization is as follows: When the key K is closed and the battery E connected to the line by means of the transmitter-lever T, the V-shaped end of the arm $f$ comes in contact with the wedge-shaped projection $e$ and forces the spring $d$ away from the screw $g$. The contact between $f$ and $e$ closes the shunt connecting the terminals of the coils of the receiving-magnet M, while at the same time the circuit of the bridge-wire is interrupted between $g$ and $d$. The result of this change in the connections is that the current of charge passes directly by the wires 2, 3, and 4 to the line L, and can produce no effect upon the receiving-instrument M, as the latter is at that moment disconnected from the circuit. The current of discharge coming from the line at the terminal of a signal, in like manner and for the same reason, passes directly to the earth by the wires 4, 3, and 2, without reaching the receiving-magnet M.

It is obvious that the momentary disconnection of the receiving-magnet M from the main current which takes place at the beginning and end of each outgoing signal would have a tendency to cause a break or interruption in any signal which might at the time be coming from the distant station. This effect is prevented by the simultaneous closing of the shunt-circuit uniting the terminals of the electro-magnet, as hereinbefore described, which, by forming a path for the induced current arising from the discharge of the electro-magnet itself, prolongs the duration of its magnetism for a sufficient length of time to hold its armature in position until the normal current is restored by the closing of the bridge-wire. The duration of the time during which the bridge-wire is disconnected and the shunt-circuit is connected by the action of the transmitter is capable of being adjusted by means of the screw $g$, while the time at which the same operation commences with reference to the movement of the transmitter T is regulated by means of the screw $i$, which adjusts the position of the arm $f$.

It is obvious that the distribution of the continuous current between the main and artificial lines will take place precisely as in the ordinary duplex apparatus.

I remark that although I have found the mechanism hereinbefore described well adapted to produce the result set forth I do not desire to confine myself thereto, as many mechanical combinations of apparatus may be devised, by means of which the bridge-wire may be temporarily disconnected at the instant of charge and discharge and the receiving-magnet shunted at the same instant, and this may obviously be done without departing in the least from the general principle of my invention. I also remark that it may be sufficient in some instances to merely shunt the receiving-magnet without disconnecting the bridge-wire, or under other circumstances to disconnect the bridge-wire without shunting the receiving-magnet; but I have found in practice that the best results are obtained by the simultaneous action of devices whereby both these results are produced, substantially in the manner hereinbefore described.

I claim as my invention—

1. The hereinbefore-described method of preventing the effects of static charge and discharge of the line upon the home receiving-instrument of a duplex telegraph, which consists in temporarily disconnecting the branch of the circuit in which said instrument is included at the instant the line is connected either to the battery or to the earth at the home station.

2. The hereinbefore-described method of preventing the effects of static charge and discharge of the line upon the home receiving-instrument of a duplex telegraph, which consists in temporarily disconnecting the branch of the circuit in which said receiving-instrument is included at the instant the line is connected either to the battery or to the earth at the home station, and in simultaneously establishing a temporary connection between the terminals of the electro-magnet of the receiving-instrument.

3. The combination, substantially as hereinbefore set forth, of a main line, an artificial line, a battery, a key or transmitter which connects and disconnects said battery to and from said main line simultaneously, a receiving-instrument included in the circuit of a bridge-wire between the main and artificial lines in a position neutral to outgoing currents, and a circuit-breaker actuated by said key or transmitter, whereby said bridge-wire is temporarily disconnected at the instant the connection between the battery and the main and artificial lines is either broken or closed.

4. The combination, substantially as hereinbefore set forth, of a main line, an artificial line, a battery, a key or transmitter which connects and disconnects said battery to and from said main line simultaneously, a receiving-instrument included in the circuit of a bridge-wire between the main and artificial lines in a position neutral to outgoing currents, a normally-open shunt-circuit, which, when closed, unites the terminals of the electro-magnet of the receiving-instrument, and a circuit-closer actuated by said key or transmitter, whereby said shunt is momentarily closed at the instant the connection between the battery and the main and artificial lines is either broken or closed.

5. The combination, substantially as hereinbefore set forth, of a main line, an artificial line, a battery, a key or transmitter which connects and disconnects said battery to and from said main line simultaneously, a receiving-instrument included in the circuit of a bridge-wire between the main and artificial lines in a position neutral to outgoing currents, a normally-open shunt-circuit which, when closed, unites the terminals of the electro-magnet of the receiving-instrument, and a circuit-changer actuated by said key or transmitter, whereby said bridge-wire is interrupted and said shunt-circuit simultaneously closed at the instant the connection between the battery and the main and artificial lines is either broken or closed.

In testimony whereof I have hereunto subscribed my name this 7th day of June, A. D. 1881.

STEPHEN DUDLEY FIELD.

Witnesses:
WILLIAM H. KENYON,
MILLER C. EARL.